UNITED STATES PATENT OFFICE.

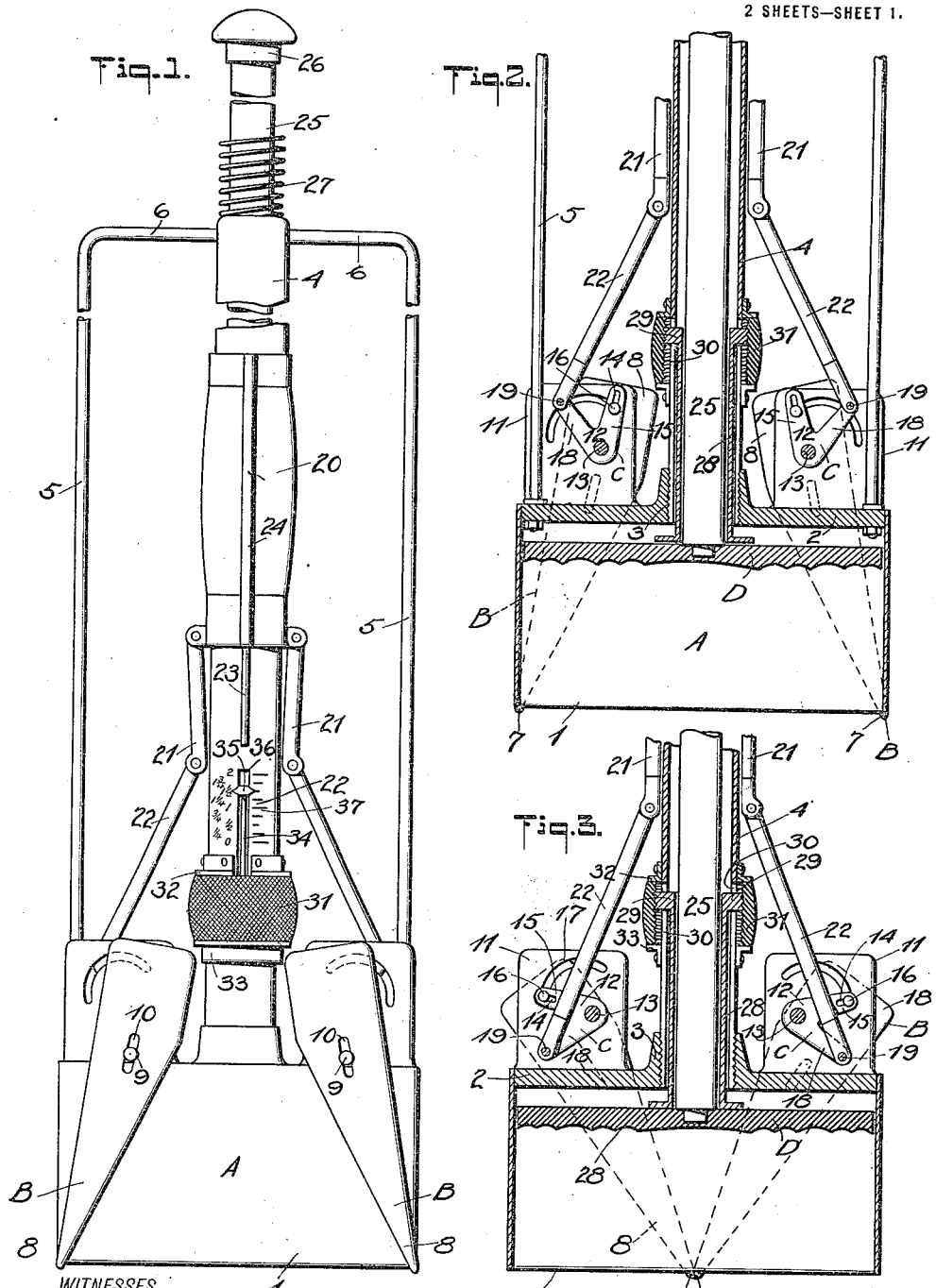

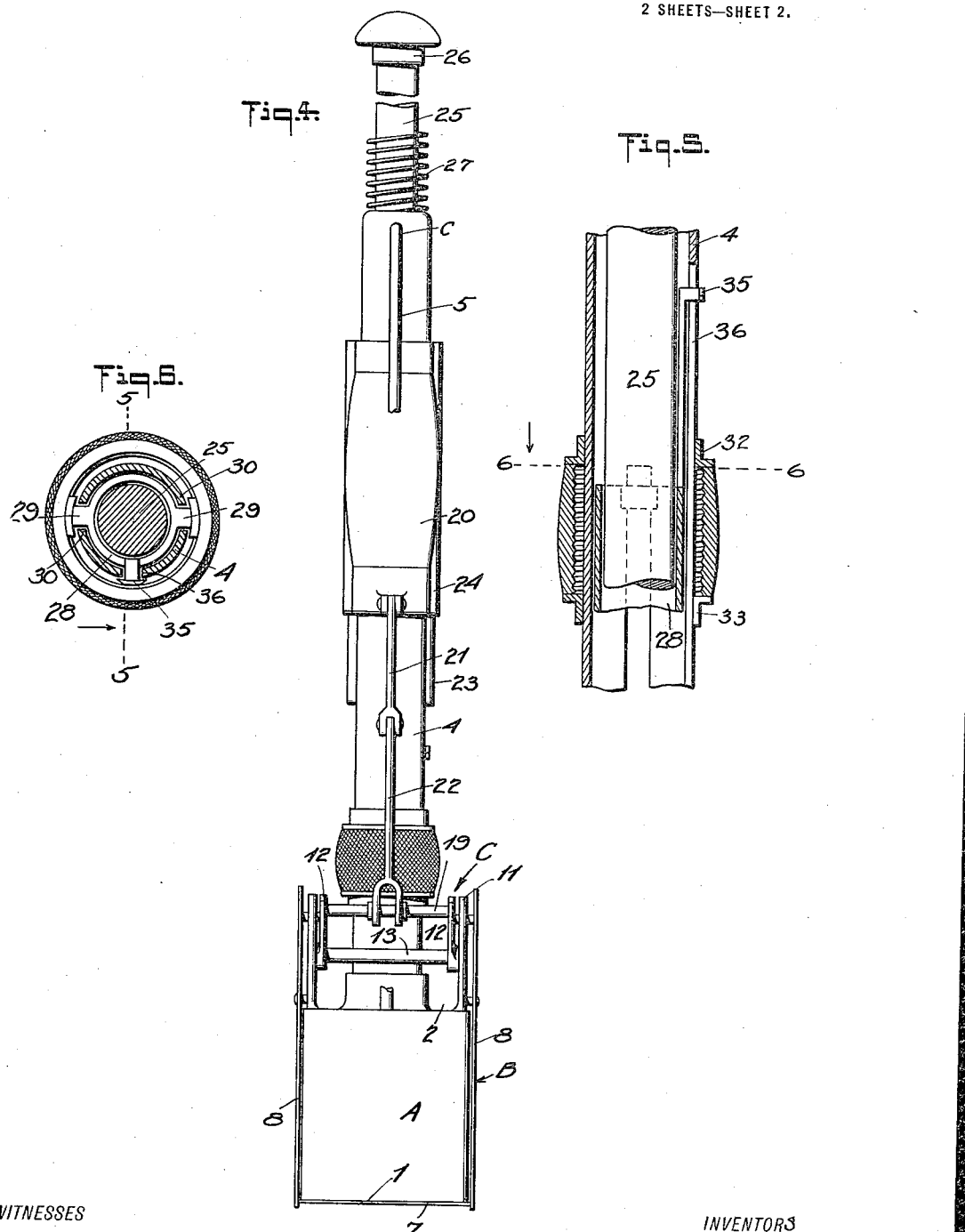

HENRY B. DROSIN AND MAX GORDON, OF NEW YORK, N. Y.; SAID DROSIN ASSIGNOR TO SAID GORDON.

BUTTER-CUTTER.

1,141,784.   Specification of Letters Patent.   Patented June 1, 1915.

Application filed August 31, 1914. Serial No. 859,357.

*To all whom it may concern:*

Be it known that we, HENRY B. DROSIN and MAX GORDON, subjects of the Czar of Russia, and residents of the city of New York, borough of Brooklyn, in the county of Kings and State of New York, have invented a new and Improved Butter-Cutter, of which the following is a full, clear, and exact description.

This invention relates to a device for cutting butter, lard and the like into blocks or cakes of any desired weight for domestic trade, the device being especially adapted for use by storekeepers, whereby butter and the like can be bought in bulk at wholesale and then cut into pound or other cakes for the retail trade.

The invention has for its general objects to improve and simplify the construction and operation of cake butter cutters so as to be reliable and efficient in use, comparatively simple and easy to manipulate, and of durable and substantial design.

A more specific object of the invention is the provision of a butter cutter comprising an open bottom box having an adjustable plunger therein for determining the weight of the cake of butter to be produced, there being a novel arrangement of cutting devices which move inwardly from the ends of the box along the bottom thereof for severing the butter from the mass after the box has been filled, by the pressing of the device downwardly into the mass of butter.

A further object of the invention is the provision of a novel and effective ejecting means for removing the butter after the cutters have been restored to their initial position, and also the provision of an indicating device whereby the plunger, which latter constitutes a print or mold, is adjusted to a position for making cakes of any desired weight.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a front view of the device; Fig. 2 is a vertical section thereof with the cutting elements in initial position; Fig. 3 is a similar view with the cutting elements having completed their cutting strokes; Fig. 4 is a side view of the device; Fig. 5 is an enlarged sectional view of that part of the handle rod that has the plunger adjusting element, the section being taken on the line 5—5, Fig. 6; and Fig. 6 is a sectional view on the line 6—6, Fig. 5.

In the present instance the butter cutter is shown as a single cake cutting device, but it is to be understood that the cutting box may be made into several compartments for simultaneously cutting a plurality of cakes, if desired, the remaining parts of the apparatus being the same as shown in the drawing.

Referring to the drawings, A designates the cutting box of the apparatus, which box comprises a rectangular body having an open bottom 1 and a closed top or cover 2. This top has a central opening 3 for receiving the tubular handle 4 which may be braced from the box by side bars 5 which have their upper extremities 6 bent inwardly and connected with the handle rod 4. These parts 6 may form convenient grips whereby both hands can be used for grasping the device and pressing the box A into a mass of butter or other material which is to be divided into cakes.

After the box has been forced into the mass of butter it is necessary to sever the butter in the box from the mass, and for this purpose a pair of cutting elements B are arranged on the box in such a manner that they simultaneously move to sever the butter, the severing being effected by wires 7 which extend transversely across the bottom of the box, each wire being connected at its ends in any suitable manner with swinging plates 8 disposed at the front and rear sides of the box A. These cutting elements formed by the wires 7 and plates 8 are so mounted that in their movement the cutting wires 7 travel rectilineally along the bottom of the box, the wires in their initial position being at the ends of the box, as shown in Fig. 2, so that when the cutting elements are moved, the wires travel toward the middle of the box, as shown in Fig. 3, after severing the block of butter. The cutting elements B swing on pivots 9 fastened to the top of the box, and extending through slots 10 in the plates 8, and each plate is connected with a lever frame C which is disposed between upstanding lugs or equivalent members 11 on the top 2 of the cutter box. Each frame C may be made in any suitable manner, but, as shown, it comprises a pair of bell-crank levers 12 mounted on a horizontal shaft 13 supported by the lugs or members 11, and these levers 12 have slots 14 in the arms 15 to receive lugs or pins 16 fastened to the plates 8, such pins 16 extending inwardly from the plates through guide slots 17 in the members 11. These guide slots 17 are so shaped that as the cutting elements B swing the movement thereof will be guided in such a manner that the cutting wires 7 will move in straight lines or parallel with the bottom of the box A. The arms 18 of each pair of levers are connected by a cross rod 19, so that the levers will move together. The lever frames C which are disposed at opposite sides of the central handle rod 4 are adapted to be simultaneously operated by a sliding handle or sleeve 20 arranged on the handle rod 4, and any suitable connecting means may be employed between the handle 20 and cutting elements B, the connecting means shown being a pair of hingedly connected links 21, 22, that are attached to the lower end of the handle 20 and to the rods 19 of the lever frames C. To prevent turning of the handle 20 a feather or key 23 is arranged on the handle rod 4 to engage in a groove 24 on the handle 20, but of course this is not essential to the operation of the device. When the handle 20 is moved downwardly it forces the cutting elements from the position shown in Figs. 1 and 2 to that shown in Fig. 3, whereas by moving the handle or grip 20 upwardly, the cutting elements will be retracted or thrown outwardly.

Within the box A is an ejecting plunger and mold D which has rigidly secured thereto a plunger rod 25 that is housed within the handle rod 20 that is tubular, and the plunger rod extends upwardly out of the handle rod 4 and terminates in a knob or equivalent device 26, whereby the plunger rod can be actuated to press the plunger D downwardly to eject the butter or other material in the box A. A spring 27 may be arranged on the upper end of the plunger rod and bear on the upper end of the handle rod 4, so that when the plunger rod is pressed downwardly the knob or head 26 will engage the spring and cause the latter to be compressed, the object of this being that when the butter is almost ejected, say with a quarter of an inch of the cake remaining in the box A, the operator can suddenly release the knob 26, so that the spring 27 will lift the plunger D, whereby the plunger pulls away from the cake of butter, which latter is then ready to drop out of the box.

In order to adjust the capacity of the box to form cakes of different weight, an adjustable stop in the form of a sleeve 28 is arranged in the lower end of the handle rod or tube 4. The lower end of this tubular stop 28 extends into the box A and is adapted to be engaged by the plunger so as to limit the upward movement of the latter while the cutting box A is pressed into the butter. This adjustable stop or sleeve 28 has outwardly-extending lugs 29 which project out through slots 30 in the handle rod 4 and which are threaded so as to engage an internally-threaded adjusting ring 31 that is rotatably confined between shoulders 32 and 33 on the handle tube 4. By turning this ring 31 in one direction or the other the stop 28 can be moved upwardly or downwardly to thereby determine the position of the plunger D.

In using the device the same is positioned as shown in Fig. 1 on a mass of butter or other material to be cut into cakes or bricks. The operator now presses downwardly on the handle frame 4, 5, so as to cause the relatively thin bottom edges of the box to penetrate into the butter mass. Sufficient pressure is applied to cause the butter in the box to take an impression from the plunger D. With the box embedded in the butter the operator now applies a downward pressure on the handle or grip 20 so as to operate the cutting element B. The device is now raised out of the mass of butter, the cutting elements B are restored to normal position, and now the plunger rod 27 is pressed downwardly so as to cause the butter in the box to be forced out by the plunger D. If the butter does not become readily dislodged the operator removes the downward pressure on the knob of the plunger rod so that the spring 27 will force the rod upwardly and carry with it the plunger D, whereby the latter is separated from the cake of butter. The adjustment of the plunger can be ascertained by an indicator 34 which is attached to the stop 28 and has an index 35 movable in a slot 36 in the handle rod 4, there being a scale 37 divided into pounds and along which the index 35 moves. According to the showing in Fig. 1, the indicating device shows that the plunger is adjusted to a position where pound and a half cakes will be cut by the device.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as are within the scope of the appended claims.

Having thus described our invention, we claim as new and desire to secure by Letters Patent:

1. A butter cutter comprising a rectangular box having its length horizontal and open at its bottom, an upright handle connected with the center of and disposed at right-angles to the top of the box, a pair of cutters movable inwardly from the ends of the box, and actuating means for the cutters, said actuating means including an element slidable on and axially of the handle.

2. A butter cutter comprising a rectangular box having its length horizontal and open at its bottom, an upright handle connected with the center of and disposed at right-angles to the top of the box, a pair of cutters movable inwardly from the ends of the box, guides fixed on the top of the box and with which the cutters engage, whereby the cutting portions of the cutter will move rectilineally along the open side of the box, and operating means connected with the cutters for moving the same simultaneously, said operating means including a tubular grip slidable longitudinally of the handle.

3. A device for cutting material into cakes, comprising an open bottom box, a tubular handle connected therewith, a plunger disposed in the box, a rod connected with the plunger and extending through the handle, said handle having a slot, a stop device disposed in the handle and projecting into the box for limiting the movement of the plunger, said device having a member extending out of the slot, a rotatable adjusting ring surrounding the handle and having a threaded engagement with the member for adjusting the stop, and means for preventing the ring from moving axially of the handle.

4. A cutting device of the class described comprising a box open at its bottom, pivoted cutting elements mounted on the box and having wires movable along the bottom of the box, lever frames mounted on the box and connected with the cutting elements, guide means for guiding the movement of the elements to cause the wires to move in a common plane and along the bottom of the box, a handle rod connected with the box, a sleeve slidable thereon, connections between the sleeve and lever frames for actuating the cutting elements, a plunger within the box, a plunger rod connected with the plunger and extending through the handle rod, a tubular stop disposed around the plunger rod and housed within the handle rod for determining the position of the plunger and thereby the capacity of the box, and a ring rotatably mounted on the handle rod and operatively connected with the stop for adjusting the same.

5. An apparatus of the class described comprising a cutting box, a handle rod connected with the center of the box and extending at right-angles to the length of the latter, bracing elements connected with the extremity of the handle rod and with the ends of the box and serving as grips for operating the apparatus, a plunger within the box, a rod extending through the handle rod and connected with the plunger, a knob on the outer end of the plunger rod, and a spring on the plunger rod and bearing on the handle rod and adapted to be engaged by the knob as the plunger rod is moved to eject the material from the box, whereby the spring can lift the plunger when the operator releases the knob.

In testimony whereof we have signed our names to this specification in the presence of two subscribing witnesses.

HENRY B. DROSIN.
MAX GORDON.

Witnesses:
SAMUEL AARON GORDON,
PHILIP SAMILSON.

Copies of this patent may be obtained for five cents each, by addressing the "Commissioner of Patents, Washington, D. C."